United States Patent

Labriola et al.

[15] 3,645,673

[45] Feb. 29, 1972

[54] PROCESS FOR THE PRODUCTION OF POTASSIUM NITRATE BY THE ION EXCHANGE METHOD

[72] Inventors: Mario Labriola, Milan, Italy; Sandor Vajna, Bad Honnef, Germany

[73] Assignee: Dynamit Nobel Aktiengesellschaft, Troisdorf, Germany

[22] Filed: Dec. 1, 1969

[21] Appl. No.: 881,272

[52] U.S. Cl. ...................................... 23/102 A, 23/50 BE
[51] Int. Cl. ......................................... C01d 9/04
[58] Field of Search .............................. 23/102, 50; 75/108

[56] References Cited

UNITED STATES PATENTS

| 2,366,651 | 1/1945 | Rawlings | 23/50 X |
| 2,606,098 | 8/1952 | Bauman | 23/50 X |
| 3,492,092 | 1/1970 | Higgins | 23/102 X |

OTHER PUBLICATIONS

Nached, F. C. et al., Ion Exchange Technology; Academic Press; N.Y. 1956 pp. 14– 20.
Mayer S. W. et al.; in " Journal of the American Chemical Society" Vol. 69; Nov. 1947.

Primary Examiner—Oscar R. Vertiz
Assistant Examiner—G. O. Peters
Attorney—Burgess, Dinklage & Sprung

[57] ABSTRACT

Process for the manufacture of potassium nitrate in the ion exchange method by reaction of nitric acid with potassium ions of a cation exchanger and recharging of the exchanger bed, characterized in that the water filled exchanger bed is supplied with a series of five feed groups, the third group being composed of the nitric acid process feed, the fifth group being composed of pure water, and wherein from the exchanger bed there is won a series of five withdrawn groups, the third withdrawn group comprising the potassium nitrate product of the ion exchange, the second, fourth, and fifth withdrawn groups being reused as, respectively, said first, second, and fourth feed groups.

10 Claims, No Drawings

PROCESS FOR THE PRODUCTION OF POTASSIUM NITRATE BY THE ION EXCHANGE METHOD

BACKGROUND

The production of potassium nitrate by the ion exchange method through the reaction of nitric acid and potassium salts is in the prior art. The known processes all operate on the same basic principle, according to which nitric acid is fed to the exchanger bed, which is charged with potassium ions, and which usually contains a cation exchanger prepared from polystyrene by sulfonation. In these known processes it has been found that a great excess of nitric acid must be used in order to remove all of the potassium ions from the exchanger, and that the product obtained contains usually considerable amounts of nitric acid in addition to potassium nitrate.

In order to reduce this excess of nitric acid a number of various proposals have been made. For example, in one case about four to six exchanger beds have been connected in series, and when the first exchanger bed was heavily or practically completely charged with hydrogen ions it was taken from the chain of the series connected beds; at the same time, an exchanger bed freshly charged with potassium ions was connected as the last bed in the chain. The nitric acid was fed always to the first exchanger bed, and the mixture of potassium nitrate and nitric acid was obtained always from the exchanger bed that was last in the series. By this known process it was possible to reduce considerably the amount of nitric acid required; for example, 97 percent of the exchanger capacity could be charged with hydrogen ions by using 120 percent nitric acid with reference to the total capacity of the exchanger. This process, however, entails considerable disadvantages, because it requires an expensive system of apparatus, inasmuch as merely for the reaction in the one direction a higher number of exchanger beds is necessary, all of which have to contain the same number of valves, and each of which is used in each position in the series. In the performance of the process, four to six input valves have to be closed simultaneously along with the same number of outlet valves, and the same number of valves has to be opened immediately thereafter. But in order to perform the counterreaction in this process, i.e., the charging of the exchanger bed with the potassium ions, about the same number of additional exchanger beds is necessary. Furthermore, exchanger beds must additionally be provided, in which the solutions can be washed out or the exchanger bed packing can be reverse flushed. Since the individual steps of the process in this case have to be coordinated with one another in such a manner that the reversing of the valves is performed simultaneously, it can immediately be seen that in order to perform the process in an apparatus constructed for the purpose, an extremely complicated automatic control would be necessary, and that this apparatus would be extremely liable to trouble, and furthermore any troubles that might occur could be detected only with great difficulty. Another disadvantage of this known process is the considerable quantities of water that are mixed in, which also have to be removed by evaporation in the further processing.

According to another known process, a single exchanger bed is used, which is charged into a long, tubular vessel. Then, at the one end of the vessel, the exchanger that has become laden with hydrogen ions is removed, and at the opposite end the corresponding amount of an exchanger laden with potassium ions goes in to replace it. At the same time, the entire charge of exchanger in the vessel is advanced, so that, at the end of the movement, the charge is in the same position as it was before the reaction. The infeed of nitric acid or water and the removal of potassium nitrate or water, as the case may be, is performed by means of feed lines and drain lines arranged laterally on the vessel. The liquids move in the vessel in a direction opposite that of the charge.

The apparatus required for the performance of this known process has a much simpler construction than the apparatus for the performance of the first-described process, while the quantity of nitric acid used in order to achieve the same result in substantially the same. Another advantage of this process over the one described before is that water is added to the solution in considerably smaller quantities, so that the product can be obtained at considerably lower costs than in the other process. The process, however, has the disadvantage that the amount of exchanger that is necessary for the same output is greater than in the process previously described. This is to be attributed to the fact that the exchanger charge is out of operation during the movement in the vessel, that a considerable part of the charge is outside of the bed, and that at each infeed and outlet a certain thickness of the charge is needed for the distribution of the liquids and thus is not available for the reaction itself. In addition, a relatively large amount of water is needed even in this process in order to remove completely the residues of the nitric acid. On the other hand, however, the nitric acid has to be removed entirely, because any residues remaining in the exchanger form free chlorine with the hydrochloric acid that develops in the exchanger bed during the counterreaction, and the chlorine can destroy the exchanger material prematurely. Neither can one overlook the effect on the exchanger material itself of the high rate at which the charge is moved through the vessel, resulting in attrition which can considerably increase the cost of potassium nitrate manufacture.

THE INVENTION

The present invention is directed to the problem of developing a process in which the quantity of nitric acid which brings about the same degree of exchange in the exchanger bed can be reduced to the same extent that it is reduced in the methods described above, but in which a substantially simpler apparatus can be used than in the process first described, and the same production can be achieved as in the secondly described process but with considerably smaller amounts of exchanger, the addition of water to the product being diminished in the same manner as the second process as well, and finally less water has to be used for the complete removal of nitric acid after the end of the exchanger reaction than is necessary in the process described above.

The solution of this problem is a new process for the manufacture of potassium nitrate by the ion exchange method through the reaction of nitric acid with the potassium ions of a cation exchanger and the recharging of the exchanger bed, which is characterized by the fact that at least a first group consisting preferably of two to five fractions and containing potassium nitrate in a concentration increasing gradually from virtually zero to virtually the entire concentration of the next group, a second group consisting preferably of three to 10 fractions, whose total concentration is virtually constant and equal to that of the pure nitric acid added, and which contains potassium nitrate in a quantity decreasing gradually to virtually zero and nitric acid in a quantity increasing gradually to virtually the full concentration, a third group consisting of pure nitric acid, a fourth group consisting of two to five fractions in a concentration diminishing gradually almost to zero and containing mostly nitric acid plus potassium nitrate in small amounts, and a fifth group consisting of pure water are delivered to the water-filled exchanger bed, and from the exchanger bed at least a first group of fractions containing most of the unbound water present in the exchanger bed and small amounts of potassium nitrate, a second group whose fractions are identical to those of the first group fed in, a third group containing the potassium nitrate formed by ion exchange and the unreacted remanent nitric acid, a fourth group whose fractions are identical to those of the second group fed in, and a fifth group whose fractions are identical to those of the fourth group fed in, are recovered, the first and third group of fractions obtained from the exchanger bed being separated, and the other groups being held over and reused in the next exchange cycle after the recharging of the exchanger bed with potassium ions.

After the completion of the process steps just described, the exchanger bed contains only a few tenths of a percent of the total nitric acid capacity, but this can be removed from the exchanger bed very easily by feeding water to it. The amount of water required amounts to only about twice the volume of the exchanger bed, which is a small amount of water in comparison to the prior art processes.

The exchanger bed now laden with hydrogen ions must be laden with potassium ions by the counterreaction. For this purpose any known potassium salts can be used; it has been found particularly advantageous, however, to use solutions of potassium chloride or of potassium sulfate for recharging the exchanger bed with potassium ions, because in both cases acids develop as a product of this counterreaction, which can be used for many purposes. If the counterreaction is performed with a single addition of a potassium salt, a great excess must here again be used if it is desired to replace all of the hydrogen ions in the exchanger bed with potassium ions. This, however, is disadvantageous, not only because the consumption of the salts involved is great, but also because the product of the exchange reaction, namely the acid, is contaminated with potassium ions and hence its usefulness for further purposes is greatly limited.

To avoid these disadvantages, a procedure has been found to be advantageous in which the recharging of the exchanger with potassium ions is accomplished by feeding at least to the water-filled exchanger bed a first group consisting advantageously of two to five fractions and containing the acid forming from the anion of the potassium salt that is to be fed to the bed, in a concentration increasing gradually to the total concentration of the next group, a second group consisting advantageously of three to 10 fractions, whose total concentration is virtually constant and equal to the concentration of the potassium salt solution that is to be fed to the bed, and which contains the acid in a quantity diminishing gradually to nearly zero and the potassium salt in a quantity increasing to nearly the total concentration, a third group consisting of the pure solution of the potassium salt, a fourth group consisting advantageously of two to five fractions and containing mainly the potassium salt in a concentration gradually diminishing to nearly zero, plus some hydrogen ions in some cases, and a fifth group consisting of pure water, and by recovering from the exchanger bed a first group containing most of the unbound water present in the exchanger bed and small amounts of the acid that has formed, a second group whose fractions are identical with those of the first group fed in, a third group containing the acid that has formed and in some cases a small residue of the potassium salt fed in, a fourth group whose fractions are identical to those of the second group fed in, and a fifth group whose fractions are identical to those of the fourth group fed in, the first and third group of fractions obtained from the exchanger bed being separated while the other groups are held over and reused in the next exchange cycle after the exchanger bed has been recharged with hydrogen ions.

Performing the process in the manner described has the great advantage that the acid that forms is relatively highly concentrated, e.g., 3N to 4N, so that this acid can be used, for example, without further concentration in the regeneration of cation exchangers such as those used in the desalting of water.

Since the solutions containing the potassium nitrate have to be concentrated by evaporation to recover the potassium nitrate produced in the ion exchange process, and the more concentrated the solution is the lower the cost of the concentration process will be, it is desirable to put in the nitric acid in the highest possible concentration. It has been found that it is possible to put in the nitric acid in a concentration corresponding to that of the saturated potassium nitrate solution, because during the exchange process water if taken from the solution. That is, the precipitation of potassium nitrate in crystalline form from the solution during the process must absolutely be prevented. For this reason the concentration of the nitric acid is best made such that crystallization of potassium nitrate is prevented during the exchange.

It is especially advantageous for the ion exchange to be performed at elevated temperature in both of the procedures described, and preferably at a temperature ranging between 40° and 60° C.

The performance of the process for the manufacture of potassium nitrate and recharging the exchanger bed according to the invention is further explained by the following examples, while at the dame time some advantageous variants of the process will be described. The exchanger beds connected in series can be all of the same size or of different sizes.

EXAMPLE 1

An exchanger bed containing 65 liters of polystyrenesulfonic acid as a cation exchanger having a total capacity of 151.5 val, was charged with potassium ions by means of a KCl solution, then washed out with water and reverse flushed. In order then to charge the bed with hydrogen ions the following fractions were fed in, their volumes being the same and amounting each to 18 percent of the bed volume:

1st Group:
  10 fractions containing $KNO_3$ in a concentration increasing gradually from 0.2 normal to 1.4 normal;

2nd Group:
  27 fractions in which the concentration of the $KNO_3$ dropped gradually from 1.0 normal to 0.03 normal and the $HNO_3$ concentration increased accordingly at a total concentration diminishing from 3.2 N to 3.0 N.

3rd Group:
  six fractions of 3 N pure $HNO_3$ (=204 val) corresponding to 135 percent of the bed capacity;

4th Group:
  10 fractions containing $HNO_3$ in a concentration diminishing gradually from 3.0 N to 0.02 N.

5th Group:
  Five fractions containing a total of 63 l. of water.

From the exchanger bed the following fractions were obtained:

1st Group:
  Five fractions with a total volume of 56.5 l. of water containing 0.6 val $KNO_3$;

2nd Group:
  Identical to 1st Group fed in;

3rd Group:
  Six fractions with a total volume of 66.5 l. containing 149.9 val $KNO_3$ and 53.0 val $HNO_3$;

4th Group:
  Identical to 2nd group fed in;

5th Group:
  Identical to 4th group fed in.

The exchange reaction was performed at 50° C. The produced fraction groups 1 and 3 were separated and the other groups were reused in the next cycle. So 99.5 percent of the exchanger had been transformed to the $H^+$ form with a quantity of $HNO_3$ corresponding to 135 percent of the exchanger capacity.

In order to increase the concentration of the acids obtained in the counterexchange, the potassium salts are used in virtually saturated concentration according to one embodiment of the process of the invention. Higher temperatures have also proven advantageous, being best between 40° and 80°C.

It has furthermore been found that it is advantageous to make the quantity of potassium ions somewhat smaller than the quantity of the bound hydrogen ions on the exchanger bed. In this case, then, a pure acid can be obtained even if not all of the potassium ions in the bed have been replaced by hydrogen ions.

EXAMPLE 2

The exchanger bed obtained according to Example 1 and charged to 99.5 percent, washed out and reverse flushed, was loaded with the following fractions:

1st Group:
  10 fractions containing HCl in a concentration increasing gradually from 0.4 N to 1.4 N;

2nd Group:

25 fractions whose total concentration increased gradually from 2.6 N to 3.0 N and which contained the HCl in a concentration diminishing gradually from 2.6 N to 0.1 N, but (contained) KCl in a concentration increasing accordingly;

3rd Group:

Five fractions of 3 N pure KCl solution with a content of 148.5 val;

4th Group:

10 fractions containing KCl in a concentration diminishing gradually from 2.6 to 0.01 N;

5th Group:

Five fractions containing a total of 50.5 l. of water. HCl

The following fractions were obtained from the exchanger bed:

1st Group:

Five fractions with a total volume of 56.5 l., consisting of water and 2.0 val HCl;

2nd Group:

Identical to the 1st group put in;

3rd Group:

Five fractions with a total volume of 61.0 l, containing 146.5 val HCl and traces of KCl.

4th Group:

Identical to the 2nd group put in;

5th Group:

Identical to the 4th group put in.

The exchange reaction was performed at 60° C. Groups 1 and 3 were separated, and the other groups were reused in the next cycle.

Of the hydrogen ions present at the beginning and amounting to 99.5 percent of the capacity, an acid could thus be made whose quantity corresponded to 98 percent of the capacity and which was free of potassium ions.

Now, if we consider the reaction and counterreaction as a whole, we find that two factors most strongly affect the operating costs. The one factor is the amount of nitric acid which is required for the production of a certain quantity of potassium nitrate, and the other factor is the amount of alkali that is necessary for the neutralization of the mixture of nitric acid and potassium nitrate that is the product. Additionally, the purity of the produced acid is very important, and the potassium salt has to be considered as a contaminant. The purer the acid is, the more valuable it is, and the less potassium salt it contains, the less of this valuable salt is lost.

It has now been found that the best results are obtained if the quantity of nitric acid is established at 90 to 110 percent of the total capacity of the exchanger bed. In this case the potassium nitrate solution contains at most 13 percent $HNO_3$, which has to be neutralized with an alkaline agent, such as potassium hydroxide or potassium carbonate. Although the value of these compounds is higher than the value of the equivalent potassium chloride or sulfate, this small amount does not have a great effect on the overall costs. If 90 percent of the capacity of nitric acid is used, 10 percent potassium salt is contained in the acid obtained as the product of the counterreaction, and if 110 percent is used, 3 percent potassium salt is obtained. Which quantities are best to use depends on the current costs of the various compounds. In the processes known hitherto, on the other hand, 120 percent and more nitric acid is used, which required the use of 20 percent and more of alkalies, and increased the cost of manufacture.

EXAMPLE 3

200 ml. of the cation exchanger described were completely charged with potassium ions in an exchanger bed by treatment with excess $K_2SO_4$ solution. The washed and reverse-flushed exchanger bed was supplied with the following fractions:

1st Group:

Three fractions of 40 ml. volume each; 10 fractions of 40 ml. volume each, whose total concentration diminished from 3.15 N to 3.0 N.

3rd Group:

136.5 ml. of 3.0 N $HNO_3$;

4th Group:

Four fractions of 40 ml. volume each;

5th Group:

118 ml. of water.

The following fractions were obtained from the exchanger bed:

1st Group:

107 ml. of water containing 3.2 mval $KNO_3$;

2nd Group:

Identical to the 1st group fed in;

3rd Group:

126 ml. of solution containing 389.0 mval $KNO_3$ and 16.4 mval $HNO_3$;

4th Group:

Identical to the 2nd group fed in;

5th Group:

Identical to the 4th group fed in.

So about 4 percent $HNO_3$ was left in the product of the exchange, while the exchanger was charged with 392.2 mval of $H^+$ ions (=94.3 percent of capacity).

After washing out and reverse flushing, this exchanger bed was then treated with the following fractions:

1st Group:

Three fractions of 40 ml. volume each;

2nd Group:

12 fractions of 40 ml. volume each;

3rd Group:

136.5 ml. of 3.0 N KCl solution;

4th Group:

Three fractions of 40 ml. volume each;

5th Group:

109 ml. of water.

The following fractions were obtained from the exchanger bed:

1st Group:

107 ml. of water containing 4.5 mval HCl;

2nd Group:

Identical to 1st Group put in;

3rd Group:

167 ml. of solution containing 389 mval HCl and 16.0 mval KCl;

4th Group:

Identical to 2nd Group put in;

5th Group:

Identical to 4th Group put in.

In this case, the volume of the outcoming 1st group was made slightly greater, thereby slightly increasing the loss of HCl, though the concentration of the product (Group 3) was increased. In both reactions Groups 1 and 3 were separated from the outcoming fractions, and the others were reused in the next cycle.

A potassium nitrate solution was obtained to which only about 4 percent KOH had to be added to neutralize it; the HCl contained only around 4 percent KCl.

It is precisely when the nitric acid input is 90 percent of the capacity and this acid is transformed almost completely to $KNO_3$ and so no alkali is consumed, that the loss of potassium salt is the greatest, namely 10 percent. To reduce this loss, a procedure is followed according to another variant of the invention, in which an additional group of fractions whose total concentration is equal to the nitric acid fed in but which contain small amounts of potassium nitrate is fed in between the third and fourth group of the fractions. After nitric acid was delivered to the upper layers of the exchanger bed, the bed contained only bound hydrogen ions, while the first potassium ions appeared lower down, in a quantity increasing down to the outlet of the solution. Then the additional fractions are put in. The potassium they contain is exchanged for hydrogen ions in the uppermost layers so that a pure nitric acid flows on down. This acid further reacts in the lower layers and absorbs potassium ions. Fractions thus flow out of the exchanger bed which again contain potassium ions. In the meantime, however, a portion of the potassium bound in the vicinity of the outlet is removed and transported to the layers located close to the entrance. This has the advantage that in the counterreaction a portion of the potassium ions remains on the exchanger bed and does not get into the product, i.e., into the acid, if the potassium ions put into the bed amount to less than 100 percent of the capacity. Nevertheless, even with the smaller amount, it is brought about that the bed is completely charged with potassium ions because a portion of the potassium ions already present can remain on the bed. This effect is further enchanced if the sequence in which these additional fractions are fed in is such that first the one with the lowest potassium content goes in, and the one with the highest potassium content is fed in at the conclusion.

It is true that this effect is somewhat diminished by the fact that these fractions are followed by the former fourth group, which also consists mainly of acid and small amounts of $KNO_3$, and which also reacts in the manner described previously. The same effect also occurs when the first group of fractions is fed in during the counterreaction, which contains mainly the acid, namely HCl or $H_2SO_4$. Nevertheless, relatively few ions are contained in these fractions, since both groups are dilute solutions whose contrary action can only weaken the action of the following group of fractions, but not cancel it. Another procedure would be to determine this contrary action by experiment and vary the feed of the next group of fractions accordingly. In this case it may be advantageous not to feed in the fraction that is richest in potassium nitrate, but to feed in another fraction, and to use the richest fraction as the second or third one. In any case, the process leads to a reduction of the potassium content in the acid obtained as the product.

By an additional advantageous variant of the process according to the invention it is possible to reduce still further the amount of nitric acid required. This is achieved when two or more exchanger beds are connected in series, and the sequence in which they are supplied with nitric acid is the reverse of what it is when the potassium chloride is being fed in.

In this way it is possible to charge the exchanger bed to which the solutions are fed almost always completely with the cation involved, namely the hydrogen or potassium ion. This bed is at the outlet in the counterreaction, so that the solution can be obtained at the beginning almost free of the infed ion. In this case the procedure is to utilize not the entire capacity but a somewhat smaller portion of it. Thus the solution fed in is likewise completely transformed.

EXAMPLE 4

In this case two exchanger beds A and B, which were connected together and each contained 350 ml. of the described cation exchanger, were used. The sequence in the infeed of the KCl solution was from A to B, and in the infeed of the $HNO_3$ it was from B to A. The reactions were performed at room temperature.

The following fractions were delivered to bed A:
1st Group:
   Three fractions with a volume of 100 ml. each;
2nd Group:
   Nine fractions with a volume of 100 ml. each;
3rd Group:
   502 ml. of 3.0 N KCl solution;
4th Group:
   Three fractions with a volume of 100 ml. each;
5th Group:
   400 ml. of water.

At the outlet of bed B the following fractions were obtained:
1st Group:
   362 ml. of water with an HCl content of 15 mval;
2nd Group:
   identical to the 1st Group fed in;
3rd Group:
   639 ml. of solution containing 1,477 mval HCl and 9.5 mv KCl;
4th Group:
   Identical to the 2nd Group fed in;
5th Group:
   Identical to the 4th Group fed in.

After washing out and reverse flushing, the following fractions were put into Exchanger bed B:
1st Group:
   Three fractions with a volume of 100 ml. each;
2nd Group:
   Three fractions with a volume of 250 ml. each, 2 with a volume of 100 ml. each, and 1 with a volume of 50 ml.
3rd Group:
   502 ml. of 3.0 N $HNO_3$;
4th Group:
   Three fractions with a volume of 100 ml. each;
5th Group:
   455 ml. of water.

The following fractions were obtained from Exchanger bed A:
1st Group:
   371 ml. of water containing 14.5 mval $KNO_3$;
2nd Group:
   Identical to the 1st Group fed in;
3rd Group:
   489 ml. of solution containing 1,479 mval $KNO_3$ and 9.8 mval $HNO_3$;
4th Group:
   Identical to the 2nd Group fed in;
5th Group:
   Identical to the 4th Group fed in.

In both reactions, fraction groups 1 and 3 were separated from the outflowing solution and the other groups were reused in the next cycle.

Of the total capacity of the two exchanger beds, 1,600 mval, approximately 1,490 mval was used (=93.5 percent). 0.9 percent of this was lost in the water of the first runnings. After the exchange, 3 to 4 mval of the starting substances, i.e., 0.2 percent was left in the exchanger bed. Only 0.65 percent of the ions placed in the bed was contained in the products, i.e., their purity amounted to 99.36 percent.

It has been found that products that are not yet completely pure are obtained in the manner described. The fractions of the fourth group always contain a portion of the ions remaining in the second exchanger bed at the end of the reaction, since in this case complete recharging is never performed. These ions are partially taken back by the bed being used as the first bed and they appear in the final portions of the product. Now, in order to arrive at entirely pure products, it is possible according to the invention to use a separate series of the fractions for each exchanger bed. These fractions are independent of one another and are made up in a manner adapted to the altered circumstances. In this manner practically pure products are obtained in both reactions.

EXAMPLE 5

In this example the same exchanger beds were used as in Example 4, and in the same sequence as well, except that in this case a separate battery of the groups of fractions was used for each exchanger bed.

The following fractions were placed in bed A:
1st Group:
   Three fractions of a volume of 50 ml. each;
2nd Group:
   Five fractions of a volume of 60 ml. each;
3rd Group:
   500 ml. of 3.0 N solution of KCl;
4th Group:
   Three fractions of a volume of 50 ml. each;
5th Group:
   205 ml. of water.
To bed B:
6th Group:
   Three fractions with a volume of 50 ml. each;
7th Group:
   Five fractions with a volume of 60 ml. each;
8th Group:

580 ml. of intermediate solution from the discharge from A;
9th Group:
Three fractions with a volume of 50 ml. each;
10th Group:
195 ml. of water.
The following fractions were obtained from the exchanger beds:
Exchanger Bed A:
1st Group:
180 ml. of water containing 7 mval of chlorides;
2nd Group:
Identical to the 1st group fed in;
3rd Group:
580 ml. of intermediate solution;
4th Group:
Identical to the 2nd group fed in;
5th Group:
Identical to the 4th group fed in.
Exchanger Bed B:
6th Group:
182 ml. of water containing 8 mval of chlorides;
7th Group:
Identical to the 6th group fed in;
8th group:
637 ml. of exchanger product containing 1,479 mval HCl and 2 mval KCl;
9th Group:
Identical to the 7th group fed in;
10th Group:
Identical to the 9th group fed in.

After the washing out and reverse flushing, the exchanger beds were charged with the following fractions:
Exchanger Bed B:
1st Group:
Three fractions with a volume of 50 ml. each;
2nd Group:
Six fractions with a volume of 60 ml. each;
3rd Group:
500 ml. of 3.0 N $HNO_3$;
4th Group:
Three fractions with a volume of 50 ml. each;
5th Group:
235 ml. of water.
Exchanger Bed A:
1st Group:
Three fractions with a volume of 50 ml. each;
2nd Group:
Six fractions with a volume of 60 ml. each;
3rd Group:
492 ml. of intermediate solution from the discharge from B;
4th Group:
Three fractions with a volume of 50 ml. each;
5th Group:
220 ml. of water.
The following fractions were obtained from the exchanger beds:
Exchanger Bed B:
1st Group:
190 ml. of water with 7 mval of nitrates;
2nd Group:
Identical to the 1st Group fed in;
3rd Group:
492 ml. of intermediate solution;
4th Group:
Identical to the 2nd Group fed in;
5th Group:
Identical to the 4th Group fed in.
Exchanger Bed A:
6th Group:
180 ml. of water containing 8 mval $KNO_3$;
7th Group:
Identical to the 6th Group fed in;
8th Group:
487 ml. of exchanger product, containing 1,478 mval $KNO_3$ and 2 mval $HNO_3$;
9th Group:
Identical to the 7th Group fed in;
10th Group:
Identical to the 9th group fed in.

In both reactions Groups 1, 6 and 8 were separated, the intermediate groups were consumed during the reaction, and the other groups were used in the next cycle.

The solutions obtained as products had a purity of 99.85 percent.

What is claimed is:

1. In the manufacture of a $KNO_3$ solution by ion exchange, wherein a bed of an acid exchange resin is repeatedly charged with $K^+$ ions and then treated with a $HNO_3$ solution; the improvement with respect to the acid treatment portion of the cycle starting with said bed charged with $K^+$ ions and filled with rinse water, comprising sequentially passing a series of five groups of aqueous fractions through said bed, as follows:
   1. A first feed group of fractions containing $KNO_3$ in a concentration that successively increases from a low concentration to a $NO_3^-$ anion concentration substantially equal to that of the second group,
   2. A second feed group of fractions having a total relatively constant $NO_3^-$ anion concentration about equal to the operating $NO_3^-$ ion concentration in the third feed group, whose $KNO_3$ content thereof successively decreases to about 0 and whose $HNO_3$ content thereof successively increases to its maximum concentration in the third feed group,
   3. A third feed group of fractions containing solely $HNO_3$, comprising the nitric acid process feed,
   4. A fourth feed group of fractions, the $NO_3^-$ anion concentration of which successively decreases to about 0 and composed mainly of $HNO_3$ and small quantities of $KNO_3$, and
   5. A fifth feed group of fractions composed mainly of water free of $K^+$ and $NO_3^-$ ions;

and successively recovering from said bed a series of five effluent groups of fractions, as follows:
   a. a first effluent group of fractions consisting mainly of water and small amounts of $KNO_3$, which group is withdrawn from the process
   b. a second effluent group of fractions identical to said first feed group
   c. a third effluent group of fractions comprising said $KNO_3$ solution along with any remnant $HNO_3$, which is withdrawn as product from the process
   d. a fourth effluent group identical to said second feed group, and
   e. a fifth effluent group identical to said fourth feed group,
said second, fourth and fifth effluent groups being collected and used as such in a subsequent cycle as, respectively, said first, second, and fourth feed groups.

2. The process of claim 1, wherein the quantity of $HNO_3$ in said third feed group is in the range of 90 to 110 percent of the total exchange capacity of said bed.

3. The process of claim 2, wherein the maximum concentration of $HNO_3$ used is such that said bed remains free of precipitated $KNO_3$.

4. The process of claim 3, wherein the operating temperature of said bed is maintained in the range of 40° to 60° C.

5. The process of claim 1, wherein between said fourth and fifth feed groups an additional feed group of fractions is passed through said bed, the $NO_3^-$ anion concentration thereof being about equal to that of said third feed group, said additional feed group fraction containing small successively diminishing quantities of $KNO_3$, and wherein there is recovered between said fourth and fifth effluent groups an additional effluent group of fractions containing small, varying amounts of $KNO_3$, which fractions are collected and regrouped such that the $K^-$ cation content gradually decreases and, as regrouped, are used as said additional feed group in a subsequent cycle.

6. The process of claim 1, wherein said bed is recharged using a solution of a potassium salt, the anion thereof being designated "X", by sequentially passing a series of five groups of aqueous fractions through said bed following said fifth effluent group, as follows:
1. a first recharging group of fractions containing HX in a concentration increasing to the full $X^-$ ion concentration thereof in the second recharging group
2. a second recharging group of fractions having a total relatively constant $X^-$ anion concentration about equivalent to the $X^-$ anion concentration in the third recharging group, the KX concentration thereof successively increasing and the HX concentration successively decreasing to about 0
3. a third recharging group of fractions containing solely KX, comprising the recharging potassium salt solution feed
4. a fourth recharging group of fractions, the KX concentration of which successively decreases to about 0, and
5. a fifth recharging group composed mainly of water free of $K^+$ and $X^-$ ions, and successively removing from said bed a series of five withdrawn groups of fractions, as follows:
a. a first withdrawn group of fractions composed mainly of water and minor amounts of HX, which is withdrawn from the process
b. a second withdrawn group of fractions identical to said first recharging group
c. a third withdrawn group of fractions comprising HX acid product formed during the recharging, which is withdrawn from the process
d. a fourth withdrawn group of fractions identical to said second recharging group, and
e. a fifth withdrawn group of fractions identical to said fourth recharging group, said second, fourth and fifth withdrawn groups being collected and used in a subsequent cycle.

7. The process of claim 6 wherein said first, second and fourth feed and recharging groups are composed of 2–6, 3–10 and 2–5 fractions each, respectively.

8. The process of claim 6 wherein KX is selected from the group consisting of KCl and $K_2SO_4$ and said third recharging group is saturated therewith at the operating conditions of the process, which includes a temperature in said bed in the range of 40L to 80L C.

9. The process of claim 6 wherein the amount of $K^-$ cations in said third recharging group is in the range of 1 to 3 percent less than the amount of $H^-$ ions in the exchanger bed before recharging.

10. The process of claim 6 wherein at least two of said beds are used in the process, operating in series, and wherein the directions of flow of said feed and recharging groups are in opposite directions therethrough.

* * * * *

PO-1050
(5/69)

UNITED STATES PATENT OFFICE
CERTIFICATE OF CORRECTION

Patent No. 3,645,673      Dated Feb. 29, 1972

Inventor(s) Mario Labriola et al.

It is certified that error appears in the above-identified patent and that said Letters Patent are hereby corrected as shown below:

Col. 3, line 67 after "is" insert --not--;

line 70 change "if" to --is--.

Col. 5, line 13 cancel "HCl".

Col. 10, line 71 change "$K^-$" to --$K^+$--.

Col. 12, line 17 change "40L to 80L C." to --40° to 80° C.--;

line 18, change "$K^-$" to --$K^+$--;

line 20, change "$H^-$" to --$H^+$--.

Signed and sealed this 27th day of June 1972.

(SEAL)
Attest:

EDWARD M. FLETCHER, JR.
Attesting Officer

ROBERT GOTTSCHALK
Commissioner of Patents